July 19, 1932.  C. R. PATON  1,867,709
MOTOR VEHICLE
Filed Oct. 31, 1931
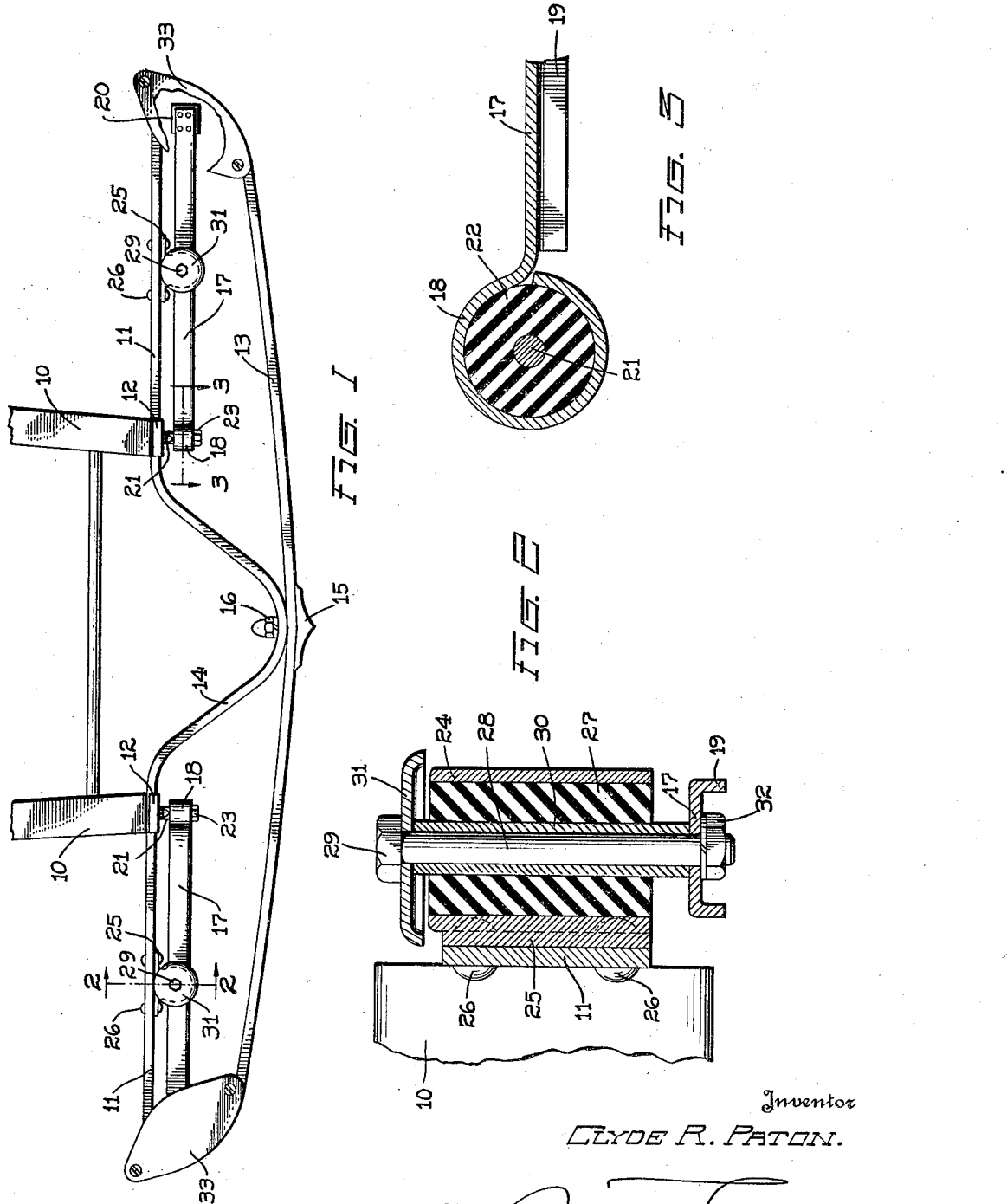
Inventor
CLYDE R. PATON.
By
Attorney Patented July 19, 1932

1,867,709

UNITED STATES PATENT OFFICE

CLYDE R. PATON, OF BIRMINGHAM, MICHIGAN, ASSIGNOR TO PACKARD MOTOR CAR COMPANY, OF DETROIT, MICHIGAN, A CORPORATION OF MICHIGAN

MOTOR VEHICLE

Application filed October 31, 1931. Serial No. 572,425.

This invention relates to motor vehicles and more particularly to the elimination of the vibratory movements commonly termed road vibrations or "shimmy."

It is an object of the invention to neutralize or absorb the energy tending to cause shimmy in an automobile by creating opposing forces of approximately the same magnitude.

It is another object of the invention to dampen vibration in a motor vehicle constituting a primary vibratory system by associating therewith a secondary vibratory system the vibrations of which oppose and neutralize the vibrations set up in the primary system due to road shocks.

A further object comprises the provision with those parts in an automobile which are subject to shimmy vibration, of resiliently supported masses which operate in sympathy and in opposite phase to the shimmy vibrations and which are designed to be of such proportions as to effectively absorb such vibrations at their inception.

Still another object of the invention resides in resiliently mounting a secondary vibration absorbing mass in rubber on the parts of a motor vehicle forming a primary vibratory system.

Other objects and advantages will become apparent to those skilled in the art from a reading of the description taken in connection with the accompanying drawing and in which:

Fig. 1 is a top plan view of a vehicle bumper construction embodying the features of the invention.

Fig. 2 is a sectional view taken substantially on the line 2—2 of Fig. 1 and;

Fig. 3 is a sectional view taken substantially on the line 3—3 of Fig. 1.

When road shock or vibration is transmitted to a vehicle there is set up a primary vibration system constituting the chassis, frame, body and other associated elements. The initial forces tending to cause shimmy are usually small but under certain conditions they build up to an extent where a noticeable shimmy and even a violent torsional vibration of the entire vehicle occurs. In accordance with the present invention, the effect of shimmy is substantially eliminated without adding materially to the weight of the automobile or to its cost of manufacture.

According to the present invention, there is provided a secondary vibration system which opposes the effect of vibrations induced into the primary vibratory system. In the secondary vibratory system, vibrations are created by energy transmitted from the primary system and which vibrations act in sympathy and in opposite phase with respect to the vibratory movements of the primary system. The secondary system is designed so that the vibrations ocurring therein have a frequency and amplitude approximating those of the vibrations in the primary system thus effectively absorbing the energy transmitted from the primary system and dampening the primary oscillations. The frequency of the secondary vibrations may be equal or less than the frequency of the primary vibrations and the amplitude of the secondary vibrations may be equal to or preferably somewhat greater than the vibrations of the primary system. Resilient, yieldable means are also provided for resisting the vibrations of the secondary system so that the energy tending to cause shimmy in the primary system is effectively dissipated.

Referring to the drawing, the two side members 10 of a vehicle frame are shown, having a bumper back bar 11 secured to the forward ends thereof by means of brackets or clips 12 which may be bolted or otherwise secured to the frame. The bumper back bar may be of any desired shape or construction and as shown has an impact bar 13 pivotally secured thereto at its ends by means of pins (not shown). The back bar 11, as shown, has an offset portion 14 adapted to contact with the impact bar 13 substantially centrally thereof and is attached thereto by means of a clip 15 and a bolt 16.

Substantially all torsional vibrations or shimmy set up in the primary vibratory system comprising the chassis, vehicle frame, body and other associated elements, are transmitted through the frame to the bumper assembly. To effectively dampen such vibrations, a secondary vibratory system is mounted on the bumper assembly which is adapted to absorb and dissipate any vibrations transmitted thereto from the primary system. As shown, this secondary vibratory system comprises a pair of levers or arms 17 mounted on each side of the neutral longitudinal axis of a vehicle. These levers or arms 17 are preferably pivotally mounted on the ends of the frame members 10 and are provided with a weight 20 on their free ends. The levers or arms 17 are preferably of inverted U-shape in cross-section to provide the preferred stiffness thereto and are provided with eye portions 18 which may be formed by cutting away portions of the flanges 19 and curling the rear end of the lever back upon itself. The frame members 10, or preferably the brackets 12, as shown, may be provided with pivot pins 21 upon which the eye portions 18 of the levers 17 are mounted, to permit pivotal movement of the levers relative to the frame members. A rubber bushing or sleeve 22 is interposed between the pivot pins 21 and the eye portions 18 of the lever members and preferably has a tight surface union with the eye portions 18 and the pivot pins 21. The desired surface union may preferably be secured by the provision of a rubber bushing which orignally has a diameter somewhat greater than that of the eye portion 18 so that when the bushing is pressed into the eye portion and the nuts 23 on the pivot pins are tightened up, the rubber bushing will be compressed radially and extended axially so that the outer peripheral surfaces thereof will be forced into a tight frictional engagement with the surfaces of the pivot pin and the eye portion of the levers. If desired, the rubber bushing may be bonded to the pivot pin and the inner surfaces of the eye portions 18 by vulcanization or by any other suitable means. It will be seen that by this construction the lever or arm members 17 are mounted for restricted pivotal movement on the pivot pins 21 and that by reason of the rubber bushings 22 frictionally engaging the sufaces of the eye portions of the levers and the pivot pins 21, the rubber will yieldingly resist such pivotal movement of the lever members by a torsional action thereof providing a resilient pivotal mounting for the lever members.

In accordance with the invention, it is desirable that the lever members be further resiliently mounted and to this end resilient and movable supports are provided intermediate the pivot points of the levers and the free ends thereof. These movable supporting members comprise a cylindrical member 24 having a flange 25 thereon for suitably securing the cylinder to the back bar 18 of the bumper by any suitable means such as by bolts 26. The cylinders 24 are open at both ends and having a cylindrical rubber sleeve 27 having an axial bore therethru secured to the inner peripheral surfaces thereof. The levers or arms 17 are secured to the rubber sleeves 27 by bolts 28 which extend axially through the bores therein and have head portions 29 extending a considerable distance above the rubber sleeves and the housings 24. Sleeves 30 are disposed in the bores of the rubber sleeves between the bolts and the surfaces of the rubber and extend between the heads of the bolts and the top surface of the lever members 17. The sleeves 30 are designed to have a tight surface union with the rubber sleeves so that no relative movement will take place. Washers 31 are interposed between the tops of the sleeves 30 and the heads of the bolts and may be extended and curved, as shown, to form spaced top covers for the cylinders 24, thus concealing the supporting members in top view. The bolts 28 and the sleeve members 30 may be suitably secured to the lever or arm members 17 by means of nuts 32, as shown. The rubber sleeve members may be secured to the adjacent surfaces of the cylinders 24 and the sleeves 30 by vulcanization or by any other suitable method of bonding the surfaces.

It will be seen from the above construction that the levers are resiliently hung intermediate their ends on the back bar of the bumper by rubber sleeves which support the members by a shearing action of the rubber, which action makes the arms and weights very sensitive to vibratory impulses. The sleeves 30 may, if desired, be dispensed with and the rubber vulcanized or otherwise secured directly to the surfaces of the bolts 28, the sleeves being merely a convenient expedient to allow the bolts to be withdrawn from the cylinder so that removal of the lever members may be accomplished separately from their rubber mountings. The desired surface union between the rubber sleeves and their associated parts may also be secured by forcing rubber sleeves into the cylinders which have a greater diameter than the cylinders, whereby the rubber will be compressed to take the form shown and will give the desired results. To effectively conceal the weights 20 in top view it is desirable to provide cover members 33 which extend between the impact bar 13 of the bumper and the back bar 11 thereof, adjacent the ends of these two members.

It has been found that the forces tending to cause shimmy are relatively small at first but that these forces rapidly build up to the point where the shimmy is apparent and it tends to build up to such proportions as to cause exceedingly violent torsional movements of the whole automobile structure. It has also been found that if these forces are checked in their incipient stages, they are prevented from building up to a point where their effect as a shimmy is apparent. These torsional movements in a motor vehicle have been found to originate at some point intermediate the ends of the frame and to increase in amplitude toward the ends of the vehicle. For these reasons it is desirable to place the secondary vibration system at a point adjacent the ends of the frame to secure the most efficient results, although if desired the secondary vibratory masses may be placed nearer the point of origination of the torsional vibratory impulses set up in the primary system. It has also been found that the amount of energy necessary to be dissipated to prevent the forces tending to cause shimmy from building up is relatively small and that the resistance of the rubber bushings 22 and the rubber sleeves 27 need be relatively slight to obtain the necessary results.

By providing the movable support, the original effective length of the lever members 17 to which the weights are attached is maintained. The length of the arms or levers 17 is relatively great and therefore the amplitude of vibration of the weights will be greater than the amplitude of vibration of the primary system and the energy taken up by the weights from the primary system will be effectively dissipated or neutralized thereby. The length of the levers and the elastic properties of the rubber mountings, are so proportioned that the natural period of vibration of the weights is approximately equal to the period of shimmy vibration of the primary system with the result that as soon as the primary system begins to shimmy, the weights will begin to vibrate in sympathy therewith and in opposite phase with relation thereto. This result is due to the relations of the natural periods of vibration of the two systems and because of these sympathetic vibrations, the energy causing the vibrations of the weights will be taken up or absorbed from the primary system.

It will be understood that the construction described and illustrated as the preferred form of this invention may be varied to a considerable extent without departing from the concept thereof. If desired, the lever or arm members 17 may be formed of spring metal so that these members will have a greater resiliency. The rubber mountings may take other forms from that specifically described and the movable supports for the lever members may be formed of other material than rubber. The construction of the invention is susceptible of numerous other changes and modifications, which will become apparent to those skilled in the art, without departing from the spirit or scope thereof. The invention is therefore to be limited only by the appended claims.

Having thus described the invention what is claimed and desired to be secured by Letters Patent is:

1. In a motor vehicle having a frame and a bumper forming parts of a primary vibratory system, a secondary vibratory system for damping the vibrations of the primary system comprising a resilient mounting secured to the bumper, and a weighted arm pivoted to the frame and secured to the resilient mounting intermediate its pivot point and the free end thereof.

2. In a motor vehicle having parts forming a primary vibratory system, a secondary vibratory system for damping the vibrations set up in the primary system comprising a support secured to a part of the primary system, and an arm pivotally mounted on a part of the primary system and mounted intermediate its pivot point and the free end thereof on said support.

3. In a motor vehicle having parts forming a primary vibratory system, a secondary vibratory system for damping the vibrations set up in the primary system comprising a support secured to a part of the primary system, a weighted arm pivotally mounted on a part of the primary system and mounted intermediate its pivot point and the weighted portion thereof on said support.

4. In a motor vehicle having parts forming a primary vibratory system, a secondary vibratory system for damping the vibrations set up in the primary system comprising an arm mounted on parts of the primary system and a resilient support for the arm disposed intermediate the mounted end and the free end thereof.

5. In a motor vehicle having parts forming a primary vibratory system, a secondary vibratory system for damping the vibrations set up in the primary system comprising a resilient support, and an arm mounted on parts of the primary system and supported intermediate its mounting and the free end thereof on said resilient support.

6. In a motor vehicle having a frame and a bumper forming parts of a primary vibratory system, a pivot pin associated with the frame, a secondary vibratory system for damping the vibrations of the primary system comprising an arm having an eye portion to pivotally secure the arm to the pivot pin for movement relative to the bumper, a rubber bushing interposed between the adjacent opposing surfaces of the eye portion and the pivot pin and having a surface union therewith, said rubber bushing acting in torsion to resist oscillatory movement of the arm relative to the pivot in, a movable mounting for the arm intermediate the pivot point and the free end thereof comprising resilient rubber in tension resisting engagement with the arm and the bumper and resisting movement of the arm relative to the bumper through shearing action of the rubber, and a weight on the free end of the arm.

7. In a motor vehicle having parts forming a primary vibratory system, a secondary vibratory system for damping the vibrations of the primary system comprising a weighted lever pivoted to one of the parts of the primary system for substantially vertical pivotal movement relative thereto, and resilient means mounted on the primary system and disposed intermediate the pivot point of the lever and the free end thereof to yieldingly oppose movement of the lever.

8. In a motor vehicle having parts forming a primary vibratory system, one of the said parts having a pivot pin secured thereto, a rubber bushing on the pivot pin, a secondary vibratory system for damping vibrations of the primary system comprising a lever pivotally mounted on the rubber bushing, said rubber bushing frictionally engaging the opposing surfaces of the pivot pin and the lever and resisting the pivotal movement of the lever through torsional action.

9. In a motor vehicle having parts forming a primary vibratory system, a secondary vibratory system for damping vibrations of the primary system comprising a lever secured at one end to the primary vibratory system, and a rubber mounting secured to the primary system and disposed intermediate the ends of the lever to movably support the lever, said rubber resisting relative movement of the lever through shearing action of the rubber.

10. In a motor vehicle having parts forming a primary vibratory system, a secondary vibratory system for damping vibrations set up in the primary system comprising a rubber mounting secured to one of the parts of the primary system, and a lever supported by the rubber mounting.

11. In a motor vehicle having parts forming a primary vibratory system, a secondary vibratory system for damping vibrations set up in the primary system comprising a rubber mounting secured to one of the parts of the primary system, and a lever having a weight thereon, said lever being supported by the rubber mounting.

12. In a motor vehicle having parts forming a primary vibratory system, a secondary vibratory system for damping vibrations set up in the primary system comprising rubber mountings secured to some of the parts of the primary system, and an arm engageable with and movably supported by the rubber mountings, one of said rubber mountings resisting movement of the arm relative to said parts by a torsional action of the rubber and the other of said rubber mountings resisting such relative movement of the arm by a shearing action of the rubber.

13. In a motor vehicle, the combination of the frame, a bumper secured thereto including a back bar and an impact bar, a vibration damping device including a weight mounted adjacent the impact bar and concealed thereby in front view, and a cover extending across the top of the bumper between the back bar and the impact bar whereby the weight is also concealed in top view.

14. In a primary vibratory system including an elongated structure subjected to torsional vibratory movements gradually increasing in magnitude from a point intermediate the ends to the ends thereof, a secondary vibratory system adapted to dampen the torsional vibrations set up in the primary system comprising a pivotally mounted arm secured to the primary vibratory structure on each side of the neutral longitudinal axis and adjacent an end thereof, and a weight on each of said arms.

15. In a primary vibratory system including an elongated structure subject to torsional vibratory movements gradually increasing in magnitude from a point intermediate the ends to the ends thereof, a secondary vibratory system adapted to dampen the torsional vibrations set up in the primary system comprising a pivotally mounted arm secured to the primary vibratory structure on each side of the neutral longitudinal axis and adjacent an end thereof, a weight on said arms, and a resilient support for each of said arms mounted on parts of the primary vibratory system and disposed between the pivot points of the arms and the weights thereon.

In testimony whereof I affix my signature.

CLYDE R. PATON.